United States Patent [19]

Moehrmann

[11] Patent Number: 5,625,865

[45] Date of Patent: Apr. 29, 1997

[54] CIRCUIT ARRANGEMENT FOR CONTROLLING THE TRANSMISSION OF INFORMATION FOR INTERACTIVE SERVICES

[75] Inventor: Karl-Heinz Moehrmann, Munich, Germany

[73] Assignee: Siemens Aktiengesellschaft, Munich, Germany

[21] Appl. No.: 531,277

[22] Filed: Sep. 20, 1995

[30] Foreign Application Priority Data

Sep. 29, 1994 [DE] Germany .......................... 44 34 918.1

[51] Int. Cl.[6] .................................................. H04N 7/173
[52] U.S. Cl. ................... 455/4.2; 348/7; 348/12; 348/13; 455/4.1; 455/5.1
[58] Field of Search ...................... 455/4.2, 3.1, 4.1, 455/5.1, 6.1, 6.2; 348/6, 7, 8, 9, 10, 12, 13

[56] References Cited

PUBLICATIONS

Van der Plas, G; Mestdagh, D.; Verbiest, W.; De Groote, J., ATM Over Passive Optical Networks: system design and demonstration, SPIE, vol. 1786, Fiber Newtorks for Voice, Video, and Multimedia Services 1992.

Hoffman, A.; Macq, B.; Quisquater, J., Future Prospects of the Cable TV Networks, New Technologies and New Services, pp. 13–22 1993.

Primary Examiner—John K. Peng
Assistant Examiner—Nathan J. Flynn
Attorney, Agent, or Firm—Hill, Steadman & Simpson

[57] ABSTRACT

A method and a circuit arrangement for controlling the transmission of information for interactive services are provided. The circuit arrangement includes a network structure having a network control center and into which at least one network node, at least one server, at least one connection unit connected to a plurality of network termination devices and to subscriber devices allocated thereto are inserted, wherein information between the at least one server and at least one of the plurality of subscriber devices is transmitted at least in sections in a uniform channel grid; and a peripheral control device provided in the at least one connection unit as well as in the network termination devices allocated to the respective subscriber device for controlling transmission of the information between the respective server and the respective subscriber device. The method has the steps of: controlling the transmission of information for interactive services, providing a network structure having a network control center and into which at least one network node, at least one server, at least one connection unit connected to a plurality of network termination devices and to subscriber devices allocated thereto are inserted; transmitting information between the at least one server and at least one of the plurality of subscriber devices at least in sections in a uniform grid; and controlling transmission of the information between the respective server and the respective subscriber device by using a peripheral control provided in the at least one connection unit as well as in the network termination device allocated to the respective subscriber device.

9 Claims, 3 Drawing Sheets

CIRCUIT ARRANGEMENT FOR CONTROLLING THE TRANSMISSION OF INFORMATION FOR INTERACTIVE SERVICES

BACKGROUND OF THE INVENTION

1. Field of the Invention

The invention is directed generally to information networks and more specifically to a method and circuit arrangement for controlling the transmission of information for interactive services.

2. Description of the Related Art

Coaxial networks via which analog information signals in the form of video signals are transmitted to the respective subscriber are used for contemporary cable television applications. The transmission occurs via a uniform channel grid into which the video signals are inserted. Information signals of various narrowband—or broadband—services such as, for example, telephony, interactive video on call (video on demand) or other interactive video services (tele-shopping, tele-education, etc.) can also be transmitted via these coaxial networks that are already in place.

Thus, a need has arisen for providing these information signals for example, as ATM information signals available to all subscribers in the uniform channel grid under discussion.

FIG. 1 shows an example of a prior art network structure on which such a procedure is implemented. As illustrate, a coaxial network KN having the usual tree structure is shown to the left of a hand end (connection unit CU), whereby the transmission of the information signals occurs optically or electrically. The optical transmission medium is respectively identified with a circle, whereas the electrical transmission cable drawn with thicker lines is not referenced. Further, an optical conveyer means OCC is shown that assures that electrical information signals are converted into optical information signals and vice versa. At the subscriber side, the coaxial network KN is provided with a plurality of network termination apparatus NT/A that can be set top boxes. FIG. 1 shows only one NT/A for simplicity.

The purpose of the NT/A is to modify the received or, respectively, the sent information signals to enable a connection of traditional terminal equipment. By way of example, FIG. 1 shows such terminal equipment RF,CPE/A and T. The terminal equipment RF is a standard television set, the terminal equipment CPE/A is an ATM terminal device such as, for example, a computer or a work station, and the terminal equipment T is an analog or digital telephone. The distribution TV signals are transmitted in analog form in the coaxial network KN. The signals are supplied via a TV into the connection unit CU and are supplied from the latter to all connected subscribers via the coaxial network KN. The video signals can then be received in a known way by the video receiver RF connected to a network termination apparatus NT/A.

As illustrated in FIG. 1, ATM information signals are bidirectionally transmitted. The signals are supplied, for example, by a service means designed as a video server VS connected to the connection unit CU via an ATM switching device ATMS, whereby the control of these events is undertaken by a central control means TMN. It has been proposed to transmit the ATM information signals in narrow channels corresponding to the channel grid for TV applications.

FIG. 2 shows a possibility of how such a transmission can be implemented. The transmission of the analog information signals occurs in a frequency range $B_1$ between 50 and 450 MHz in the form of video signals for cable television applications. Each video signal occupies channel with a bandwidth of 8 MHz. The digital downstream or, respectively, upstream signals of the interactive services are then inserted into this channel grid of 8 MHz above the television band. The downstream signals are thereby transmitted, for example, in a frequency band $B_2$ between 450 and 750 MHz and the upstream signals are transmitted in a frequency band $B_3$ between 750 and 1000 MHz. This procedure, however, requires an allocation of the information signals provided for a specific subscriber to specific transmission channels of the channel grid. In general, this allocation is implemented by a central control computer of the network control center TMN in combination with the local control devices SEC of the connection unit CU and the network termination apparatus NT/A. The status and control information required for this purpose, however, must thus be deposited in a table provided for this purpose in the central control computer of the network control center TMN. Before setting up a connection to a server, a subscriber must thus receive the corresponding information from this computer in order to set the reception means of the network termination apparatus NT/A to the corresponding channels.

A problem with such a procedure, however, is that the central control computer of the network control center is subject to a very high load, and the outlay is correspondingly high.

SUMMARY OF THE INVENTION

An object of the present invention is to provide a method and circuit arrangement for implementing the allocation of information to transmission channels in an efficient way.

It is an advantage of the present invention that the control of the transmission of the information signals between at least one of the servers and at least one of the subscribers is implemented by peripheral control devices of the head end or, respectively, of the appertaining network termination apparatus. This is especially advantageous since the central computer of the network control center is thereby relieved of these tasks.

In an embodiment of the present invention, depending on transmission direction, the information to be transmitted is allocated to free transmission channels by the peripheral control means of the at least one head end or, respectively, by the peripheral control means of the respective network termination means and are inserted thereinto. The allocations, on the one hand, are deposited in tables provided therefor in the peripheral control means and, on the other hand, the other peripheral control means is informed of them via internal channels, whereupon the latter sets an appertaining, internal transmission or, respectively, reception means to these transmission channels. The advantage is that the reception means is designed as a tuner that can be immediately set to the appertaining channel.

In an embodiment, depending on transmission direction, an appertaining reception means is set to the transmission channel by the peripheral control means of the at least one head end or, respectively, by the peripheral control means of the respective network termination apparatus. The transmission channel contains the allocated information at the beginning of the transmission according to the criterion of a cyclical interrogation of all transmission channels. The advantage is that the internal control channel can be used for other transmission purposes, whereby the cyclical interrogation does not cause any limitation of the dynamics since these procedures are implemented only at the beginning of the transmission. This is possible since the appertaining channels in the two directions for this connection always contain information signals provided with corresponding sender or, respectively, receiver addresses that are allocated to this subscriber.

In an embodiment of the present invention, the at least one server is a video server in order to be able to offer video on demand in a network as shown in FIG. 1.

In an embodiment of the present invention, the network structure between the at least one head end and the plurality of network termination apparatus is a coaxial network in tree structure, potentially having a preceding optical feeder path. The advantage is that the network structure already in place can be used.

In an embodiment, the information outgoing from the server comprise ATM information signals. In addition, the signals transmitted between the head end and the network termination apparatus can also comprise ATM format, except, however, for the distribution signals transmitted in band B1.

The invention shall be set forth in greater detail below with reference to the figures and an exemplary embodiment.

DETAILED DESCRIPTION OF THE PREFERRED EMBODIMENTS

Figure 3:
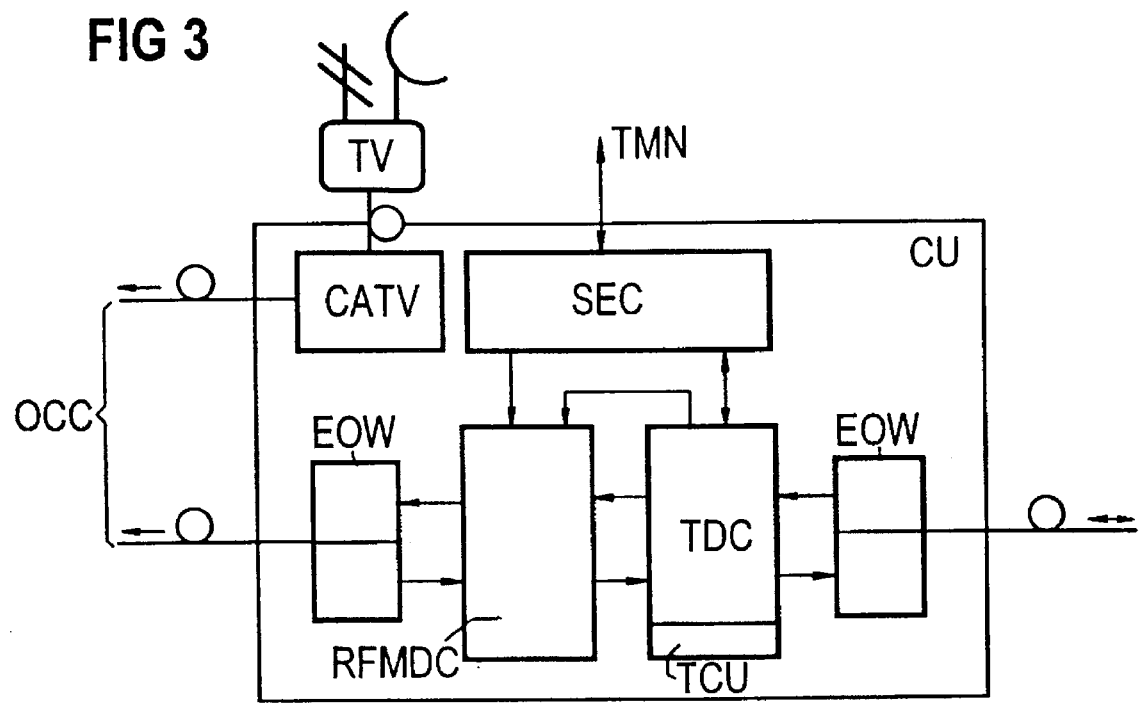
FIG. 3 is an embodiment of a transmission side of a circuit arrangement of the present invention.

FIG. 3 shows the detailed conditions in an embodiment of the connection unit CU of the present invention. The analog distribution signals are supplied into the cable network KN via TV as well as CATV. The transmission thereof between the TV and the CATV occurs via optical lines. This is indicated in FIG. 3 with a circle identifying the appertaining transmission line. The transmission, however, can also occur coaxially. The video signals are likewise supplied from the CATV to an OCC via an optical transmission line. The OCC converts the optical video signals into electrical video signals before supplying same to the subscriber via the coaxial network KN.

Independently thereof, ATM information signals of interactive services (such as, for example, information signals of a video server VS) that are inserted into a frame structure are supplied via an electrooptical converter EOW to a bit transport system TDC (downstream signals). The TDC is a type of bit transport system TDM/TDMA that controls the information transmission in a point-to-multipoint transmission. First, the ATM cell is taken from the frame structure and the cell header is interpreted. A check then occurs to see which of the channels of the channel grid generated still have free capacity available to them. When a free channel is found, the ATM cells allocated to a subscriber are inserted thereinto. The allocations between subscriber and transmission channel connected therewith are stored in a table TCU of the TDC, whereby the table TCU is constantly updated.

The allocation of the ATM information signals of the individual subscribers to the narrowband high-frequency transmission channels is decentrally implemented in the TDC. As a result, the central control computer of the network control center TMN is not burdened therewith.

The bit transport system TDM/TDMA between the head end CU and the individual network termination apparatus NT/A already comprises a transmission-oriented overhead. This means that additional bits are co-transmitted in an internal control channel via which internal system information such as, for example, control information is exchanged. With reference to the constantly updated table TCU, the control means TDC of the connection unit CU that controls the TDM/TDMA system can thus determine the degree of occupancy of the individual high-frequency channels. The individual information signals can then be inserted into an allocated multiplex signal and be inserted into a free or not fully occupied high-frequency channel. Additionally, the network termination apparatus NT/A is informed via the overhead about the channel in which the transmitted information arrives.

Figure 2:
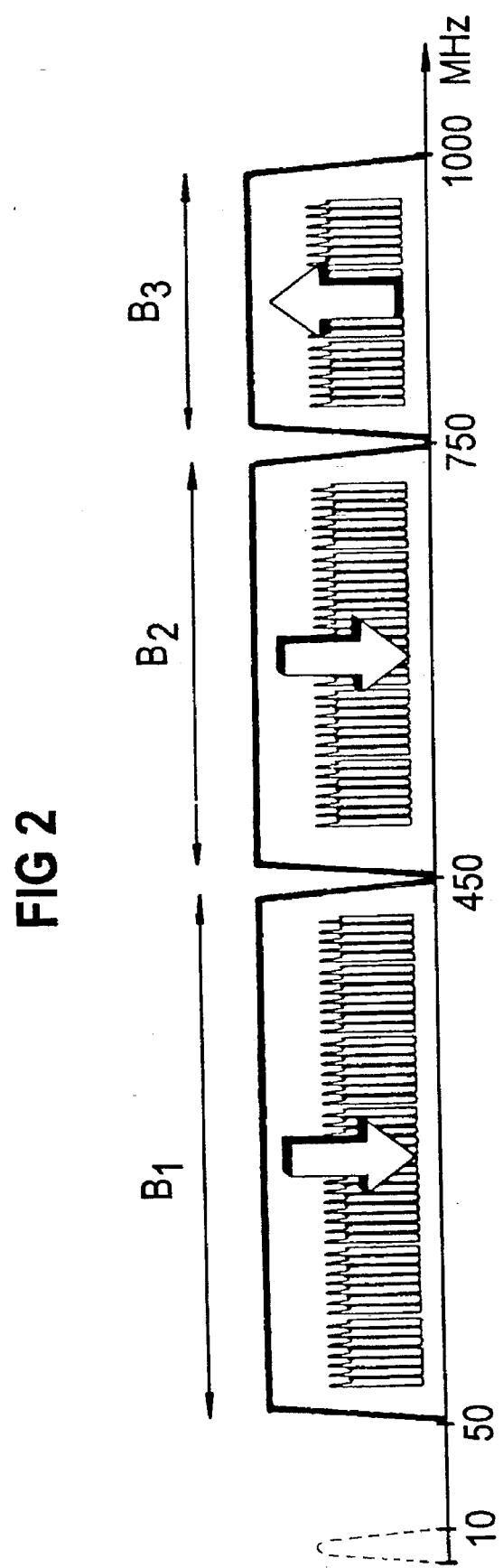
FIG. 2 illustrates a range of bandwidths for the transmission of information signals of interactive services.

The modulation procedures are implemented in a frequency modulation converter RFMDC. The information signal modified in the TDC is converted therein into a frequency range according to FIG. 2 and is subsequently forwarded via a further electrooptical converter EOW of the feeder line to the OCC that undertakes the conversion into electrical signals and the infeed into the coaxial network KN. The appertaining information signal is then supplied to the network termination apparatus of the appertaining subscriber in the channel allocated in the TDC.

Figure 1:
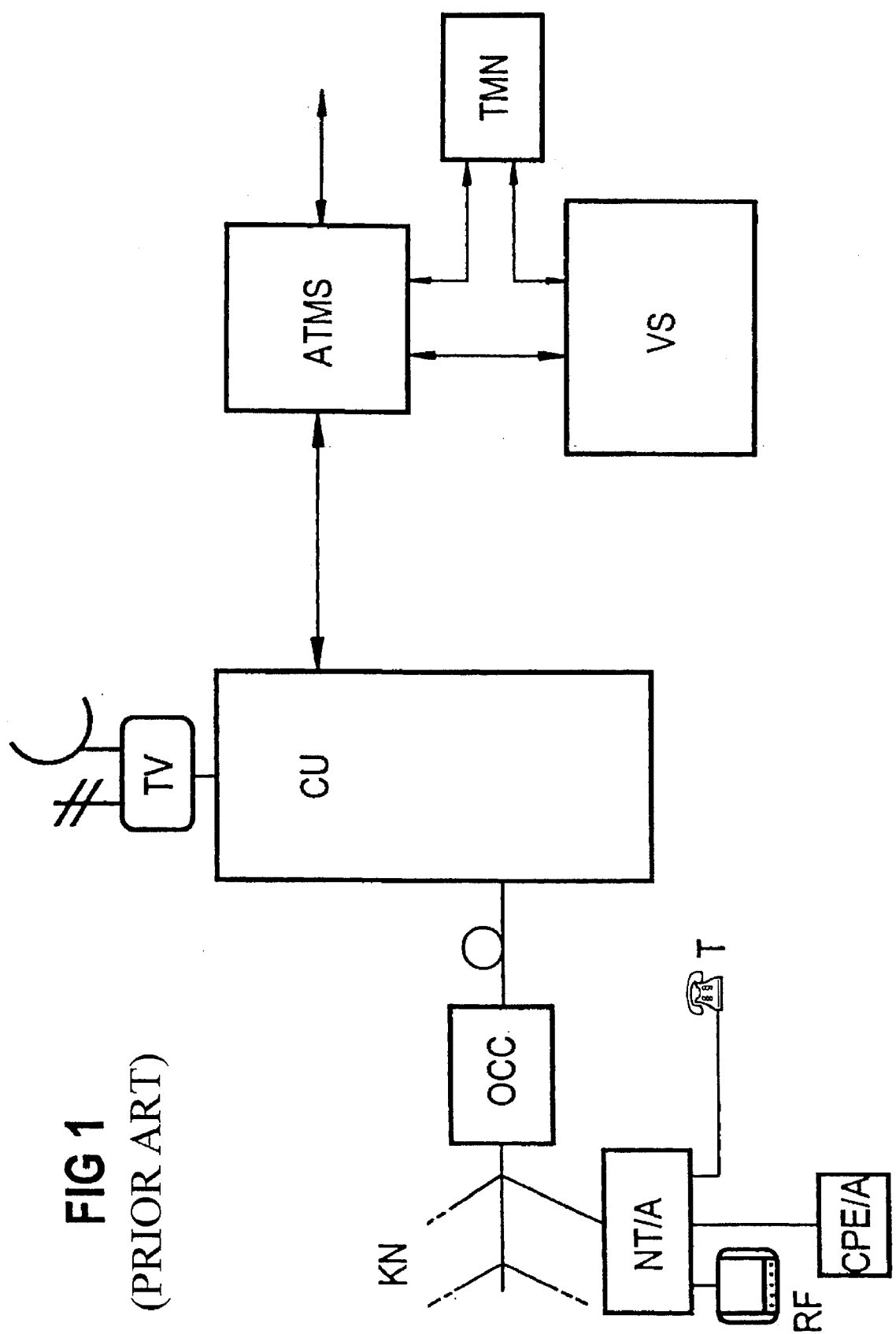
FIG. 1 illustrates a prior art network structure.

Information signals from a network termination apparatus NT/A can also be transmitted in the opposite direction to the connection unit CU in a corresponding way (upstream transmission). It should thereby be noted that only a single subscriber may transmit at a given time in order to avoid interference between the information signals proceeding from a plurality of subscribers in the connection unit CU. This situation is further complicated by different signal running times. A burst transmission is therefore provided, whereby the respective starting time of a burst in the network termination apparatus NT/A is controlled, proceeding from the connection unit CU, such that the upstream signals of the individual subscribers arrive ordered in the connection unit CU and without mutual overlap. Given transmission in ATM format, each burst expediently contains one ATM cell. Channels still having free capacity are determined by a control means SEC of the connection unit CU with the assistance of the information stored in the table TCU. When such a channel has been found, the control means SEC communicates this information to the corresponding network termination apparatus NT/A that, based on the criterion of the received information, sends its bursts in the appertaining channel and sets the RFMDC to the channel. The TDC respectively limits itself to the content of one channel; all channels are handled by the TDC parallel and simultaneously, but independently. The information signals taken from the individual channels are merged in a suitable way in the connection unit CU and forwarded to the ATM switch ATMS (see FIG. 1).

Figure 4:
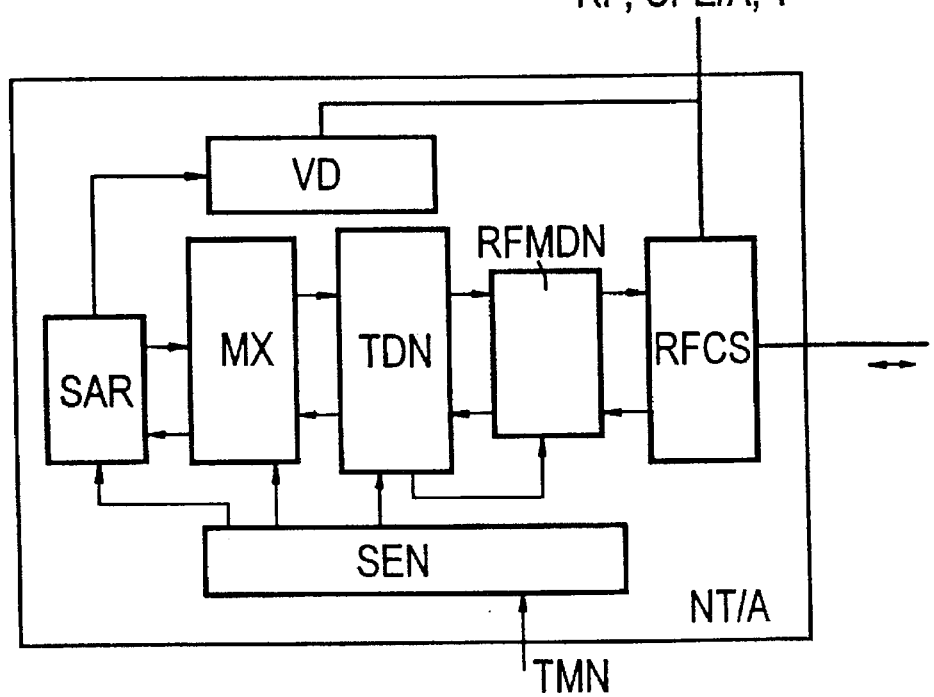
FIG. 4 illustrates an embodiment of a reception side of a circuit arrangement of the present invention.

FIG. 4 shows the corresponding conditions in the network termination apparatus NT/A. As illustrated, the ATM information signals incoming over the coaxial network KN and inserted into a channel grid are handed over at the input side to a filtering separator RFCS comprising a filter function. The RFCS separates the analog video signals (see FIG. 2) co-transmitted in the same channel from the ATM information signals of the interactive services. The analog video signals are then immediately supplied to the television set RF. The downstream ATM information signals pertaining to the interactive services are supplied to a following means RFMDN. The information signals are made available again therein in the baseband and are subsequently handed to a means TDN. The corresponding events sequence analogously for the upstream transmission.

The ATM information signals are filtered in the TDN. Only its own ATM cells—i.e., those intended for the subscriber connected to network termination apparatus NT/A—from the incoming stream of ATM information signals are handed over to a mux/demux MX. The MX comprises a multiplex/demultiplex function and sorts the information signals according to type of terminal equipment such as, for example, telephone or work station, and hands them over to a signal converter SAR. The ATM information signals are converted back into a continuous data stream therein and are handed over to a video decoder VD that generates an analog video signal that the television set can read. The complete operation is also monitored and controlled by an allocated control means SEN. The transmission of information in the return direction occurs in the opposite sequence and was already addressed above in conjunction with FIG. 3.

In an embodiment of the present invention, the network termination apparatus NT/A is not separately informed via the internal control channel with respect to that channel wherein the ATM information signals are transmitted. In this case, all channels of the incoming channel grid must be examined in the TDN of the network termination apparatus NT/A at the start of the connection to the video server VS. This is done to determine in which channels the information provided for the appertaining subscriber are inserted. When the appertaining channel has been found, the tuner means contained in the RFMDN is synchronized thereto. This procedure can definitely be tolerated in terms of outlay since the search events connected therewith need be implemented only at the start of the transmission.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. Circuit arrangement for controlling the transmission of information for interactive services, comprising:

a network structure having a network control center and into which at least one network node, at least one server means, at least one connection unit connected to a plurality of network termination means and to subscriber devices allocated thereto are inserted, wherein information between the at least one server means and at least one of the plurality of subscriber devices is transmitted at least in sections in a uniform channel grid; and first peripheral control means provided in the at least one connection unit and second peripheral control means provided in the network termination means allocated to the respective subscriber device for controlling transmission of the information between a respective server means and a respective subscriber device, wherein depending on transmission direction, the first peripheral control means of the at least one connection unit or, respectively, the second peripheral control means of the respective network termination means allocates the information to be transmitted to free transmission channels and is inserted thereinto, and that the allocated information is deposited in tables provided therefor in the first peripheral control means; and wherein the second peripheral control means is constructed and arranged such that the allocated information is provided thereto via internal channels, whereupon the second peripheral control means sets an appertaining, internal transmission means or, respectively, reception means to these transmission channels.

2. Circuit arrangement according to claim 1, further comprising:

dependent on transmission direction, an appertaining reception means set to a transmission channel by the first peripheral control means of the at least one connection unit or, respectively, by the second peripheral control means of the respective network termination means, said transmission channel containing the allocated information at the beginning of the transmission according to the criterion of a cyclical interrogation of all transmission channels.

3. Circuit arrangement according to claim 2, wherein the at least one server means is a video server.

4. Circuit arrangement according to claim 1, wherein the at least one server means is a video server.

5. Circuit arrangement according to claim 1, wherein the network structure between the at least one connection unit and the plurality of network termination means further comprises a coaxial network in a tree structure having an optical feeder line.

6. Circuit arrangement according to claim 1, wherein the information from the server means comprises ATM information signals.

7. Circuit arrangement according to claim 6, wherein the information signals exchanged between the at least one connection unit and the plurality of network termination means are ATM information signals.

8. A method for controlling the transmission of information for interactive services, comprising the steps of:

providing a network structure having a network control center and into which at least one network node, at least one server means, at least one connection unit connected to a plurality of network termination devices and to subscriber devices allocated thereto are inserted;

transmitting information between the at least one server means and at least one of the plurality of subscriber devices at least in sections in a uniform grid; and controlling transmission of the information between the respective server means and the respective subscriber device by using first peripheral control means provided in the at least one connection unit and second peripheral control means provided in the network termination device allocated to the respective subscriber device, the first peripheral control means including tables to store information;

depending on transmission direction, allocating the information to be transmitted to free transmission channels by the first peripheral control means of the at least one connection unit, or respectively, by the second peripheral control means of the respective network termination device and inserting information therein;

depositing the information allocated to free transmission channels in the tables provided therefor in the first peripheral control means; and informing the second peripheral control means of the information allocated to free transmission channels via internal channels such that the second peripheral control means sets an appertaining, internal transmission means or, respectively, reception means to these transmission channels.

9. The method according to claim 10, further comprising the steps of:

depending on transmission direction, setting an appertaining reception means to a transmission channel by using the first peripheral control means of the at least one connection unit, or respectively, by the second peripheral control means of the respective network termination device;

performing a cyclical interrogation of all transmission channels such that the transmission channel contains the allocated information at the beginning of the transmission according to the criterion of the cyclical interrogation.

* * * * *